(12) United States Patent
Yamamoto et al.

(10) Patent No.: US 8,437,097 B2
(45) Date of Patent: May 7, 2013

(54) OPTICAL FILTER

(75) Inventors: Takuji Yamamoto, Saitama (JP); Nobuo Hiruma, Saitama (JP); Motoo Takada, Saitama (JP); Kozo Ono, Saitama (JP); Masahiro Yoshimatsu, Saitama (JP); Takehiro Takahashi, Saitama (JP)

(73) Assignee: Nihon Dempa Kogyo Co., Ltd., Shibuya-Ku (JP)

( * ) Notice: Subject to any disclaimer, the term of this patent is extended or adjusted under 35 U.S.C. 154(b) by 276 days.

(21) Appl. No.: 12/804,373

(22) Filed: Jul. 20, 2010

(65) Prior Publication Data
US 2011/0019296 A1 Jan. 27, 2011

(30) Foreign Application Priority Data

Jul. 23, 2009 (JP) ................................. 2009-172323

(51) Int. Cl.
*G02B 5/22* (2006.01)
*G02B 7/00* (2006.01)

(52) U.S. Cl.
USPC .......................................... 359/885; 359/862

(58) Field of Classification Search .................. 359/885, 359/892
See application file for complete search history.

(56) References Cited

U.S. PATENT DOCUMENTS

2009/0017263 A1* 1/2009 Yeates ........................... 428/167

FOREIGN PATENT DOCUMENTS

| JP | 63-060401 | 3/1988 |
|---|---|---|
| JP | 63060401 A | 3/1988 |
| JP | 07281007 A | 10/1995 |
| JP | 2000-169166 | 6/2000 |
| JP | 2000169166 A | 6/2000 |
| JP | 2002090732 A | 3/2002 |
| JP | 2002193632 A | 7/2002 |
| JP | 2004-177832 | 6/2004 |
| JP | 2008-58427 | 3/2008 |
| JP | 4148139 | 9/2008 |
| JP | 2009042762 A | 2/2009 |

* cited by examiner

*Primary Examiner* — Jade R Chwasz
(74) *Attorney, Agent, or Firm* — Edwards Wildman Palmer LLP; Scott D. Wofsy; Christopher J. Capelli

(57) ABSTRACT

An optical filter is provided having an optical plate which has a chamfered section formed on an outer peripheral edge section of one principle surface of the optical plate and has isotropy with respect to wet-etching. The chamfered section is of an arc shape which is cross-sectionally concave in an inward direction of the optical plate.

3 Claims, 11 Drawing Sheets

OPTICAL FILTER

BACKGROUND OF THE INVENTION

1. Technical Field

The present invention relates to an optical filter which is used in electronic optical devices such as video cameras, and has functions such as infrared ray removal, and in particular relates to a chamfered optical filter.

2. Background Art

FIG. 5 and FIG. 6 include drawings for describing a conventional example of an optical filter, wherein FIG. 5A is a perspective view thereof, and FIG. 5B is a partial cross-sectional view thereof taken along arrows A-A in FIG. 5A. FIG. 6 includes drawings of a portion of a glass wafer, wherein FIG. 6A is a perspective view thereof before splitting, and FIG. 6B is a perspective view thereof after splitting.

An optical filter 1 shown in FIG. 5A comprises an optical plate 3 having a chamfered section 2 formed on the outer peripheral edge section of one principle (main) surface thereof, and an infrared-cutting optical thin film 4 formed on the one principle surface of the optical plate 3. The chamfered section 2 is C-chamfered as shown in FIG. 5B.

In this type of optical filter, first, the infrared-cutting optical thin film 4 is formed on a glass wafer 5 by means of a sputtering method or a vapor deposition method. Next, as shown in FIG. 6A and FIG. 6B, the glass wafer 5 is split along the split line B-B shown in FIG. 6A into optical plates 3 of a predetermined size, using a dicing blade 6. Finally, the chamfered section 2 is formed on the outer peripheral edge section of the one principle surface of each of the optical plates 3 by means of polishing or sandblasting with use of loose abrasive grains or fixed abrasive grains, thereby providing the optical filter 1. As shown in FIG. 7, the chamfered section 2 may also be formed on both principle surfaces of the optical plate 3.

As described above, the optical filter 1 has the chamfered section 2. Therefore, there is a reduced risk of breakage of the outer peripheral edge section of the optical filter 1 and of broken pieces becoming attached onto the principle surface of the optical filter 1, which consequently impair functions of the optical filter 1. This is because the outer peripheral edge section of the optical filter 1 becomes sharp-edged if the chamfered section 2 is not present, and the outer peripheral edge section may be easily broken if the optical filter 1 comes in contact with an object of some kind. However, by forming the chamfered section 2 on the optical filter 1, the sharp-edged sections are eliminated, and consequently breakage of the outer peripheral edge section is reduced (Patent Document 1: Japanese Unexamined Patent Publication No. 2004-177832).

However, there is a problem in the optical filter 1 configured in the way described above in that the optical thin film 4 is partially removed when splitting the glass wafer 5 shown in FIG. 6A (refer to partially removed optical thin film sections 7a and 7b in FIG. 6B). This problem arises from the stress of the dicing blade 6 which is used for splitting the glass wafer 5, being placed on the optical thin film 4 in the region in the vicinity of the split line B-B of the glass wafer 5.

Furthermore, the chamfered section 2 of the optical filter 1 shown in FIG. 5A and FIG. 5B is formed using a mechanical processing method such as polishing and sandblasting. Therefore, there is a problem in that the stress is placed on the chamfered section 2 and consequently micro-cracks 8 are formed in the chamfered section 2 (refer to FIG. 5B). If a force of some kind is externally placed on these cracks 8, the optical filter 1 is easily broken and broken pieces become attached onto the principle surface of the optical filter 1, impairing the functions of the optical filter 1.

Here, Patent Document 1 discloses an optical filter 1 in which a thick section 9 is provided in the center section of the dicing blade 6 (refer to FIG. 8A) and the inclination 9a of the thick section 9 is made equivalent to the inclination of the chamfered section 2, to thereby form the chamfered section 2 when splitting the glass wafer 5. Accordingly, there is no need for performing a separate chamfering process, and consequently productivity can be improved.

However, the stress of the dicing blade 6 is still placed on the optical thin film 4 in the region in the vicinity of the split line of the glass wafer 5 (refer to the line B-B in FIG. 6A), and there remains the problem of the optical thin film 4 being partially removed (refer to the partially removed optical thin film sections 7a and 7b in FIG. 8B). There is also a problem of micro-cracks being formed in the chamfered section 2 because the chamfered section 2 is formed in a mechanical processing method using the dicing blade 6.

Patent Document 2 (Japanese Examined Patent Publication No. 4148139) discloses an optical filter 1 in which the cross-section of the chamfered section 2 is of an arc shape which is convex in an outward direction of the optical filter, that is, an R-chamfered optical filter 1 (refer to FIG. 9). However, still the glass wafer 5 is split using a dicing blade 6, and the chamfered section 2 is formed in a mechanical processing method. Therefore the above problems remain unsolved.

An object of the present invention is to provide an optical filter that prevents the optical thin film from being partially removed and prevents micro-cracks occurring in the outer peripheral edge section of the principle surface, and that has a high yield rate.

Moreover, Patent Document 3 (Japanese Unexamined Patent Publication No. 2008-58427) discloses an optical filter in which there is formed an arc-shaped chamfered section, which is cross-sectionally concave in an inward direction of an optical plate. Hereunder is a specific description of this type of optical filter, with reference to FIG. 10.

The optical filter shown in FIG. 10A is an optical low-pass filter 13 in which an infrared-cutting glass 12 is laminated on a crystal birefringent plate 10, using an adhesive agent 11. In the outer peripheral edge sections of the principle surfaces of the crystal birefringent plate 10 and the infrared-cutting glass 12 opposing each other, there are formed arc-shaped chamfered sections 2, which are cross-sectionally concave respectively in an inward direction.

Moreover, on the reverse surface to the principle surface of the crystal birefringent plate 10 opposing the infrared-cutting glass 12, there is formed an anti-reflection film 14. Furthermore, on the principle surface of the infrared-cutting glass 12 opposing the crystal birefringent plate 10, there is formed an infrared-cutting coating layer 15.

Moreover, the optical filter shown in FIG. 10B is an optical low-pass filter 13 in which a crystal birefringent plate 10 is laminated on both of the principle surfaces of an infrared-cutting glass 12, using an adhesive agent 11. In the outer peripheral edge section of both of the principle surfaces of the infrared-cutting glass 12 there are formed arc-shaped chamfered sections 2 which are cross-sectionally concave towards the inner side of the infrared-cutting glass 12, and on one of the principle surfaces there is formed an infrared-cutting coating layer 15. Here, the crystal birefringent plate 10 is of a configuration the same as that of the crystal birefringent plate 10 shown in FIG. 10A.

These chamfered sections 2 of the optical low-pass filter 13 are formed by means of wet-etching. Therefore, micro-cracks do not occur in the chamfered sections 2. The present invention focuses attention on the shape of the chamfered section 2 which enables this type of effect.

However, the purpose of the chamfered sections 2 of the optical filter 1 shown in FIG. 10 is to prevent the adhesive agent 11 from sticking out the side surface (refer to Patent Document 3, paragraph [0012]). Therefore, even if the shape of the chamfered section 2 shown in FIG. 10 is applied as is, the chamfering effect where breakage in the edge section can be prevented, may not always be obtained.

For example, as shown in FIG. 11, in a case of forming an optical filter in which the crossing angle between the concave surface where the chamfered section 2 is formed and the principle surface of the optical plate 3 (reference symbol θC in FIG. 11) and the crossing angle between the concave surface and the side surface of the optical plate 3 (reference symbol θD in FIG. 11) are respectively 90°, the crossing sections between the concave surface, and the principle and side surfaces respectively become sharp edges and are likely to get broken, that is to say, the effect of chamfering cannot be obtained. In those cases where the optical plate is a crystal, it has anisotropy with respect to wet-etching. Therefore a uniformly angled concave surface cannot be formed in the outer peripheral edge section.

SUMMARY OF THE INVENTION

The present invention is an optical filter that it is provided with an optical plate which has a chamfered section formed on an outer peripheral edge section of one principle surface of the optical plate, and has isotropy with respect to wet-etching, and the chamfered section is of an arc shape which is cross-sectionally concave in an inward direction of the optical plate, and is formed by means of wet-etching, wherein a crossing angle between the one principle surface and a concave surface where the chamfered section is formed, and a crossing angle between the concave surface and a side surface of the optical plate where the chamfered section is formed, are respectively 100° or greater and less than 180°.

According to this type of configuration, when manufacturing an optical filter, the region where the optical thin film is partially removed can be limited to the chamfered section. Therefore, the region where the optical thin film is partially removed can be limited within a range which does not influence the functions of the optical filter, and it is thereby possible to provide an optical filter having a high yield rate.

Moreover, since the chamfered section is formed by means of wet-etching, micro-cracks will not occur in the chamfered section. Accordingly, breakage in the chamfered section can be reduced.

Furthermore, the crossing angle between the one principle surface and the concave surface where the chamfered section is formed, and the crossing angle between the concave surface and the side surface of the optical plate where the chamfered section is formed, are respectively 100° or greater and less than 180°. The present inventors have confirmed that if the crossing angles are within this range, there is low possibility of breakage even with a force applied to the crossing sections between the concave surface and the principle and side surfaces of the optical plate. Therefore, the chamfering effect of eliminating edge sections, which are likely to be broken, can be ensured, and it is accordingly possible to provide an optical filter having a high yield rate. In the optical filter of the present invention, an optical plate, which has isotropy with respect to wet-etching such as glass plate, is used, and therefore the outer peripheral edge sections can be formed in a uniform cross-sectionally concave shape.

Furthermore, in the present invention, the configuration is such that the chamfered section is formed on an outer peripheral edge section of both principle surfaces of the optical plate. Thus, the configuration of the optical filter is defined.

Moreover, in the present invention, the configuration is such that a center of a side surface of the optical plate where the chamfered section is formed is a flat surface. As a result, no sharp-angled convex sections are present on the side surface of the optical plate. Therefore, there is a reduced risk of a defect where the side surface of the optical plate is broken and broken pieces become attached onto the principle surface of the optical filter.

BRIEF DESCRIPTION OF THE DRAWINGS

FIG. 1 includes drawings for describing an embodiment of an optical filter of the present invention, wherein

FIG. 3 includes drawings for describing the embodiment of the glass wafer showing a portion illustrated with arrow X in FIG. 2, wherein

FIG. 5 includes drawings for describing a first conventional example of the optical filter of the present invention, wherein

FIG. 6 includes drawings of a portion of the glass wafer for describing the first conventional example, wherein

FIG. 8 includes drawings for describing a second conventional example of the optical filter, wherein

FIG. 10 includes cross-sectional views for describing a fourth conventional example of the optical filter, wherein

DETAILED DESCRIPTION OF PREFERRED EMBODIMENT

Figure 1A:
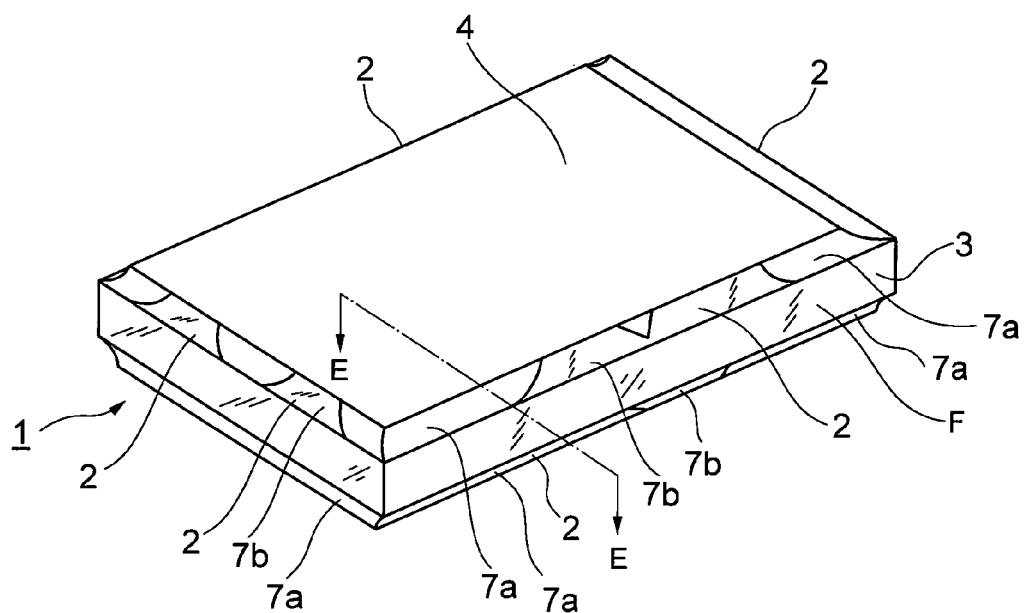
FIG. 1A is a perspective view thereof.
Figure 1B:
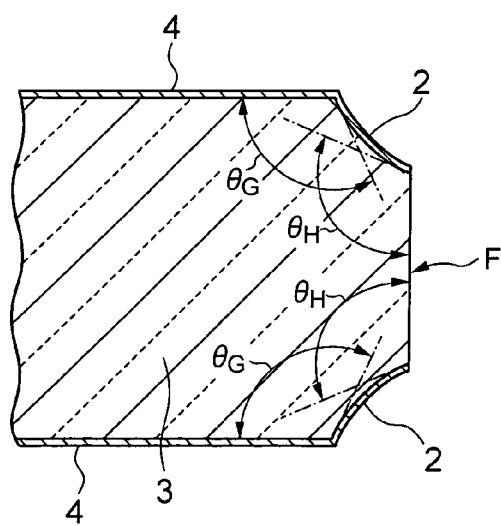
FIG. 1B is a partial cross-sectional view thereof taken along arrows E-E in FIG. 1A.
Figure 2:
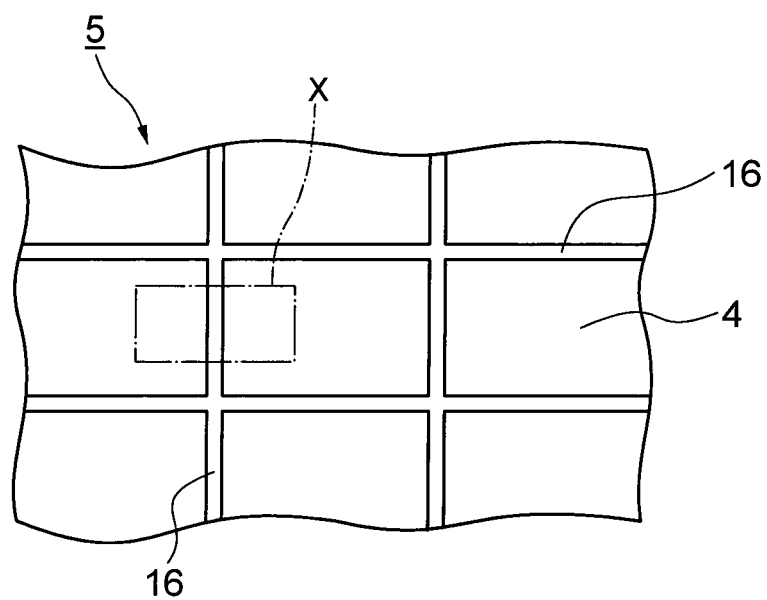
FIG. 2 is a partial plan view for describing an embodiment of a glass wafer to be used in the present invention.
Figure 3A:
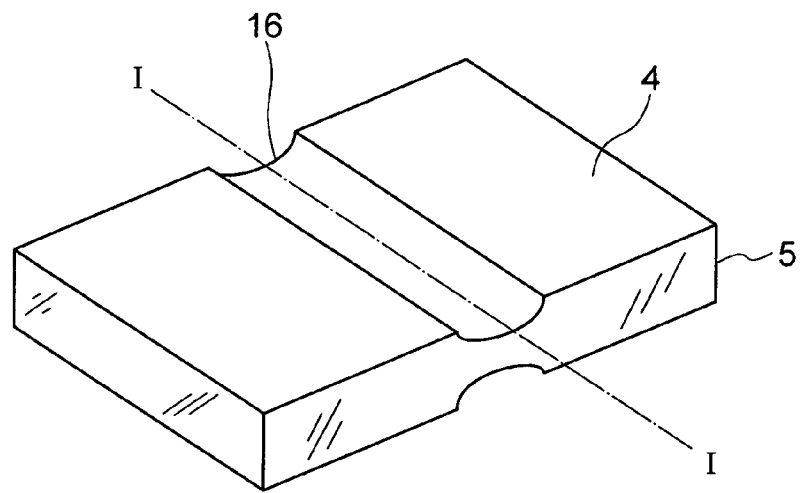
FIG. 3A is a perspective view before splitting the optical plate and FIG. 3B is a perspective view after splitting.
Figure 3B:
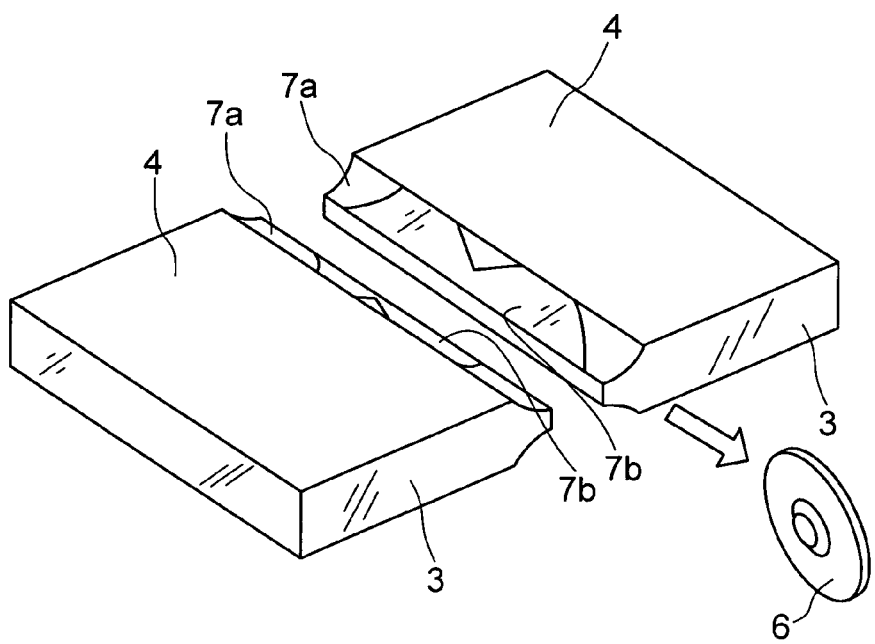

FIG. 1 to FIG. 3 are drawings for describing an embodiment of an optical filter of the present invention, wherein FIG. 1A is a perspective view thereof, FIG. 1B is a partial cross-sectional view taken along arrows E-E in FIG. 1A, FIG. 2 is a plan view of a glass wafer 5, FIG. 3 is an enlarged view of the portion illustrated with arrow X in FIG. 2, FIG. 3A is a perspective view of an optical plate before splitting, and FIG. 3B is a perspective view after splitting. The same reference symbols are given to portions the same as those in the conventional example, and descriptions thereof are simplified.

An optical filter 1 shown in FIG. 1A comprises an optical plate 3 having chamfered sections 2 formed on the outer peripheral edge section of both principle surfaces thereof, and an infrared-cutting optical thin film 4 formed on both of the principle surfaces of the optical plate 3. As shown in FIG. 1B, each of the chamfered sections 2 is of an arc shape, which is cross-sectionally concave in an inward direction of the optical plate 3.

The center section of the side surface of the optical plate 3 (refer to reference symbol F in FIG. 1B) is a flat surface.

The material of the optical plate is glass, which has isotropy with respect to wet-etching. Moreover, the crossing angle between the principle surface and the concave surface where the chamfered section 2 is formed (refer to reference symbol θG in FIG. 1B) and the crossing angle between the concave surface and the side surface of the optical plate 3 (refer to reference symbol θH in FIG. 1B), are respectively set as 100°.

In this type of optical plate, first, cross-sectionally arc-shaped concave grooves 16, which serve as split grooves, are formed on the glass wafer 5 by means of wet-etching. Next, the infrared-cutting optical thin film 4 is formed on both of the principle surfaces of the glass wafer 5 by means of a sputtering method or a vapor deposition method (refer to FIG. 2). Finally, the glass wafer 5 is split along the split line I-I in the center section of the concave groove 16, using a dicing blade 6, to thereby form the optical filter 1 (refer to FIG. 3A and FIG. 3B).

According to this type of configuration, when manufacturing the optical filter 1, the regions 7 and 7b where the optical thin film 4 is partially removed can be limited to the chamfered sections 2. Here, each 7a illustrates a portion where the optical thin film 4 is not removed. Therefore, the regions 7 and 7b where the optical thin film 4 is partially removed can be limited within a range which does not influence the functions of the optical filter 1, and it is thereby possible to provide an optical filter 1 having a high yield rate.

The reason that the regions 7b where optical thin film 4 is partially removed can be limited to the chamfered sections 2 is as follows.

As shown in FIG. 3A and FIG. 3B, in a state where the optical thin film 4 is formed on the glass wafer 5 having the concave grooves 16 formed in the lengthwise direction and widthwise direction, the glass wafer 5 is split along the split line I-I to thereby form the optical filter 1. Here, stress is applied on the optical thin film 4 when splitting the glass wafer 5. However, since the concave groove 16 is of a cross-sectionally concave shape, the stress is mainly applied to the optical thin film within the concave groove 16. Therefore, the region 7b where the optical thin film 4 is partially removed is limited to the area within the concave groove 16, that is, the area within the chamfered section 2.

Moreover, the concave grooves 16 are formed by means of wet-etching. Each of these concave grooves 16 becomes the chamfered section 2 of the optical filter 1. Therefore, microcracks do not occur in the chamfered section 2. Accordingly, risk of breakage in the chamfered section 2 is reduced, and an optical filter 1 having a high yield rate can be provided.

Furthermore, the crossing angle between the principle surface and the concave surface where the chamfered section 2 is formed (refer to reference symbol θG in FIG. 1B) and the crossing angle between the concave surface and the side surface of the optical plate where the chamfered section is formed (refer to reference symbol θH in FIG. 1B), are respectively 100° or greater and less than 180°. The present inventors have confirmed that if the crossing angles are within this range, there is a low possibility of breakage in the crossing sections between the concave surface and the principle and side surfaces of the optical plate.

Therefore, it is possible to ensure the effect of chamfering, in which sharp edges where the optical plate is likely to get broken are eliminated from the optical plate. Furthermore, regions where the crossing angle portion between the concave surface and the principle surface of the optical plate 3 is present and the optical thin film 4 is not removed (refer to reference symbol 7a in FIG. 1A), are made rounded by the optical thin film 4, and hence the possibility of breakage becomes extremely low. Therefore, it becomes possible to provide an optical filter 1 having a high yield rate.

Figure 10A:
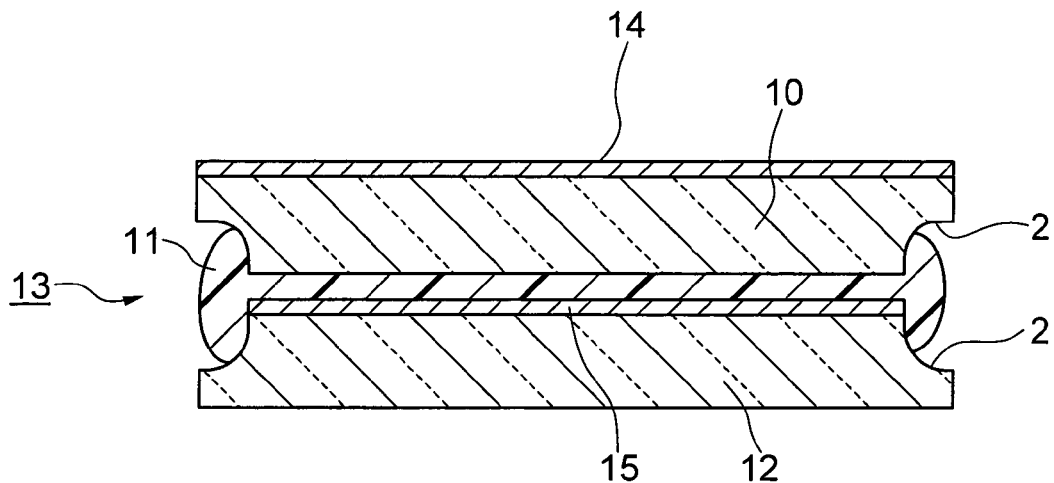
FIG. 10A is a cross-sectional view of an optical low-pass filter.
Figure 10B:
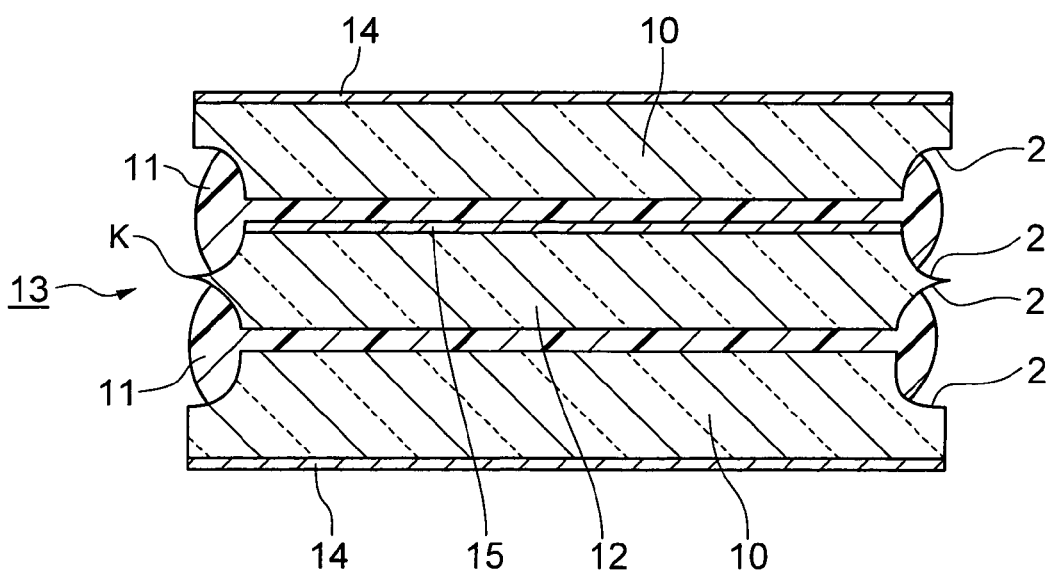
FIG. 10B is a drawing of an optical low-pass filter of another configuration.
Figure 11:
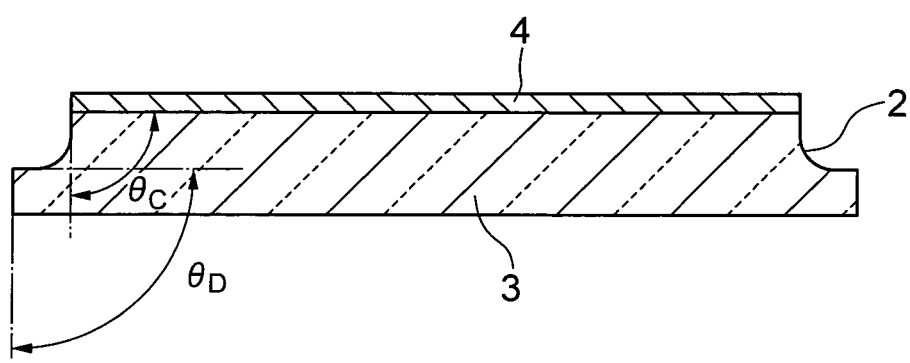
FIG. 11 is a cross-sectional view of an optical filter to which the shape of the chamfered section in the fourth conventional example is applied.

Moreover, comparing the optical filter of the present invention with the optical filter of the conventional example as shown in FIG. 10, a concave section having a sharp angle in the side surface seen in the conventional example (refer to the portion corresponding to reference symbol K in FIG. 10B) will not be formed in the present invention. Therefore, there is a significantly reduced possibility of a defect where the side surface of the optical plate is broken and broken pieces become attached onto the principle surface of the optical filter.

Figure 4:
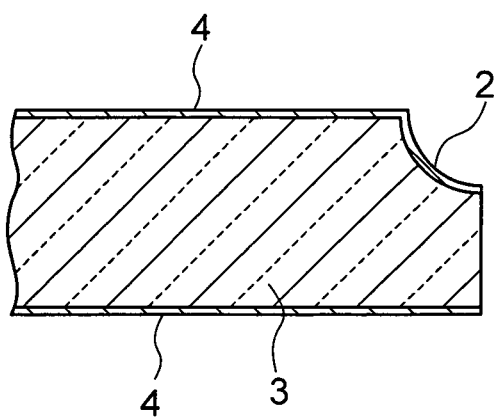
FIG. 4 is a cross-sectional view for describing another embodiment of an optical filter of the present invention.
Figure 5A:
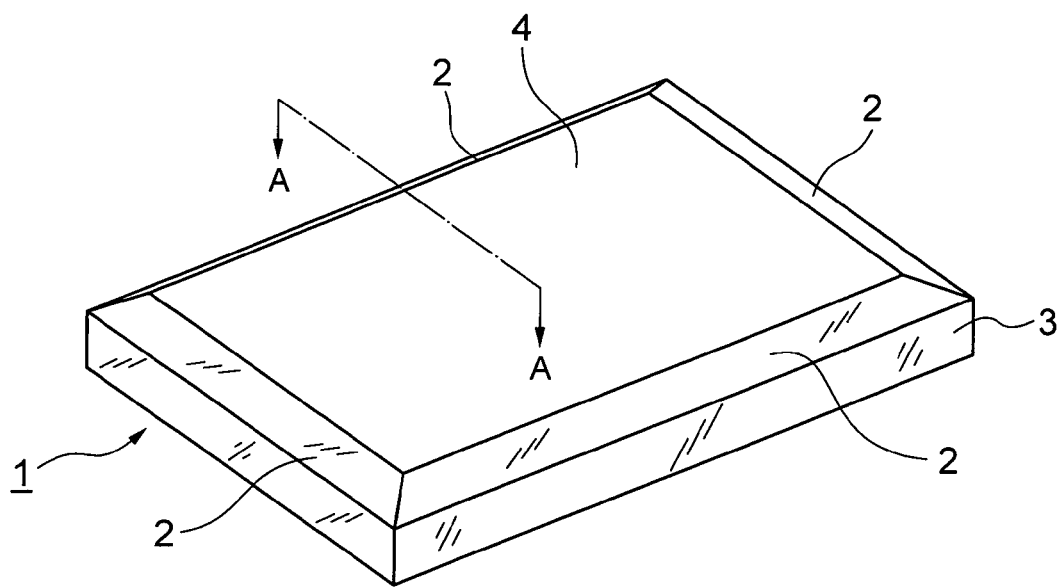
FIG. 5A is a perspective view thereof.
Figure 5B:
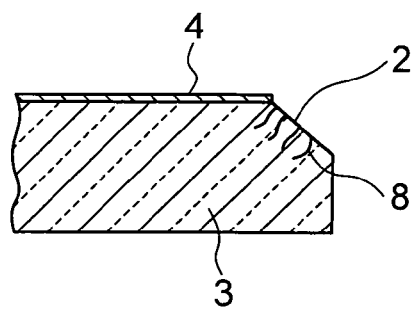
FIG. 5B is a partial cross-sectional view thereof taken along arrows A-A in FIG. 5A.
Figure 6A:
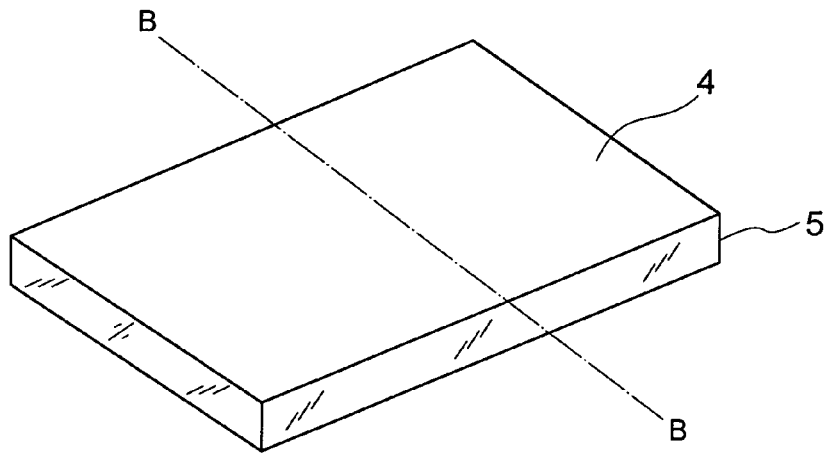
FIG. 6A is a perspective view before splitting the optical plate.
Figure 6B:
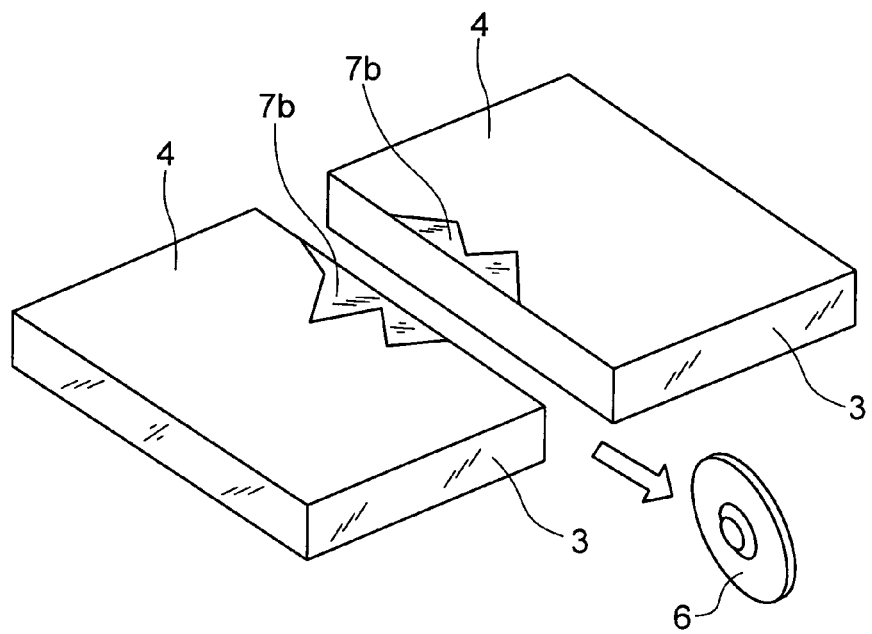
FIG. 6B is a perspective view after splitting.
Figure 7:
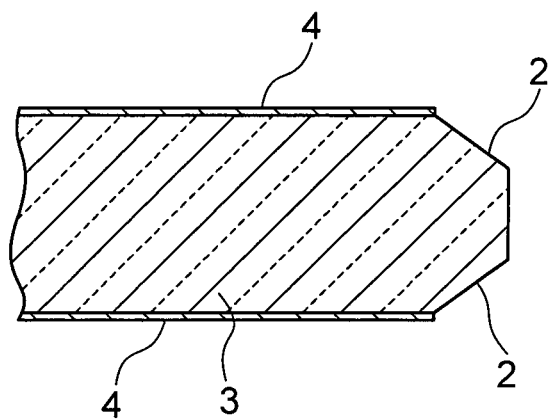
FIG. 7 is a cross-sectional view for describing the first conventional example of the optical filter of the present invention.
Figure 8A:
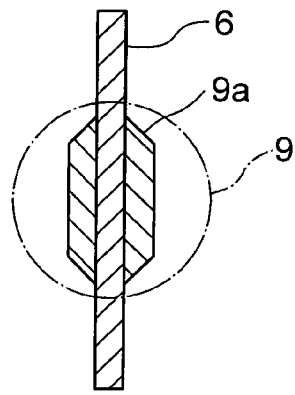
FIG. 8A is a cross-sectional view of a dicing blade.
Figure 8B:
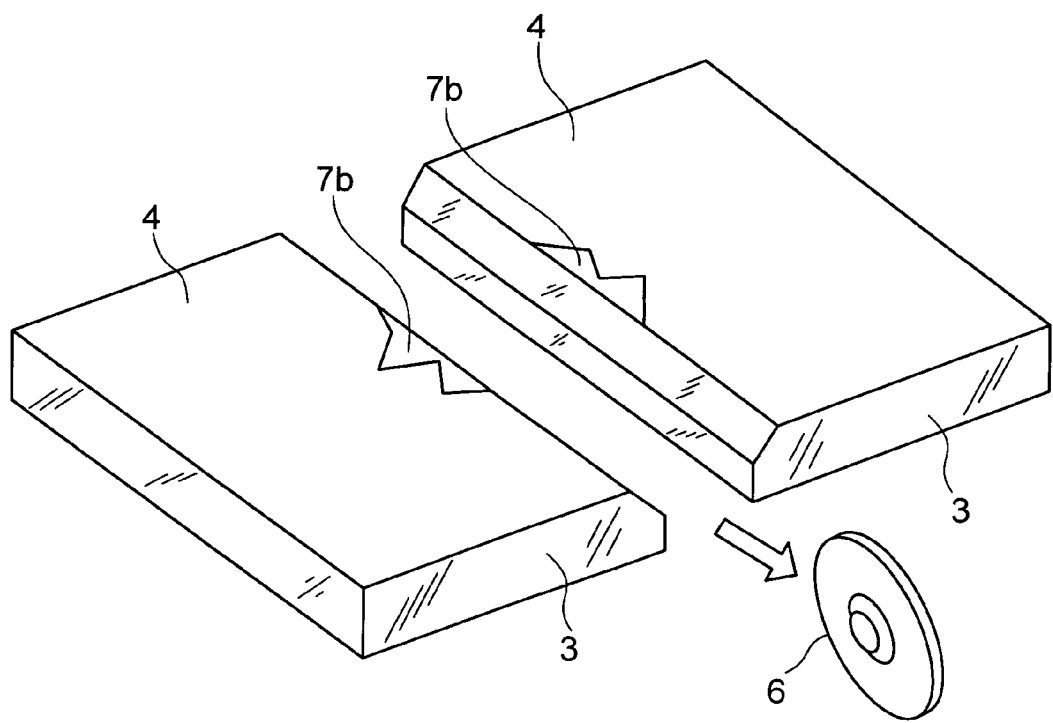
FIG. 8B is a drawing for describing a manufacturing step of the optical filter.
Figure 9:
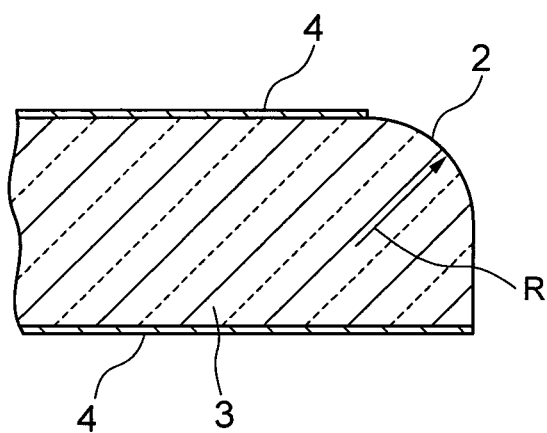
FIG. 9 is a cross-sectional view for describing a third conventional example of the optical filter.

The chamfered sections 2 are formed on both of the principle surfaces of the optical plate in the above embodiment of the present invention. However the chamfered section 2 may only be formed on one of the principle surfaces as shown in FIG. 4. Moreover, the present invention may also be applied to an optical filter configured with a lamination of a plurality of optical plates 3. Furthermore, an infrared-cutting optical thin film is used in the above embodiment. Moreover, an optical thin film that cuts other frequency bands may also be used. In addition, glass is used as the optical plate in the above embodiment, and a sapphire plate, for example, which has isotropy with respect to wet-etching may also be used.

What is claimed is:

1. An optical filter comprising:
an optical plate defined by opposing top and bottom surfaces and a planar side surface defining an outer periphery, wherein a chamfered section is formed along an intersection adjoining at least one of the top and bottom surfaces and the planar side surface thereof and isotropy with respect to wet-etching;
wherein said chamfered section is of an arc shape which is cross-sectionally concave in an inward direction of said optical plate, and is formed by means of wet-etching, and;
a crossing angle θG, between said at least one top or bottom surface and a concave surface wherein said chamfered section is formed, and a crossing angle θH, between said concave surface and a side surface of said optical plate where said chamfered section is formed, are respectively 100° or greater and less than 180°.

2. An optical filter according to claim 1, wherein an optical film is formed on at least a portion of said chamfered section.

3. An optical filter according to claim 2, wherein a center section of a side surface of an outer peripheral edge section of both said principle surfaces of said optical plate where said chamfered section is formed is a flat surface.

* * * * *